(12) United States Patent
Hedman

(10) Patent No.: US 11,953,086 B2
(45) Date of Patent: Apr. 9, 2024

(54) DEVICE FOR CONTROLLING LUBRICATION IN A STEPPED TRANSMISSION COMPRISING A SPLITTER SECTION

(71) Applicant: Volvo Truck Corporation, Gothenburg (SE)

(72) Inventor: Anders Hedman, Marstrand (SE)

(73) Assignee: Volvo Truck Corporation, Gothenburg (SE)

( * ) Notice: Subject to any disclaimer, the term of this patent is extended or adjusted under 35 U.S.C. 154(b) by 932 days.

(21) Appl. No.: 16/963,821

(22) PCT Filed: Jan. 22, 2018

(86) PCT No.: PCT/EP2018/051443
§ 371 (c)(1),
(2) Date: Jul. 21, 2020

(87) PCT Pub. No.: WO2019/141383
PCT Pub. Date: Jul. 25, 2019

(65) Prior Publication Data
US 2021/0054921 A1 Feb. 25, 2021

(51) Int. Cl.
*F16H 57/04* (2010.01)
*F16H 3/00* (2006.01)

(52) U.S. Cl.
CPC ......... *F16H 57/0458* (2013.01); *F16H 3/006* (2013.01); *F16H 57/0409* (2013.01); *F16H 57/0435* (2013.01)

(58) Field of Classification Search
CPC .. F16H 57/0458; F16H 57/0457; F16H 3/006; F16H 57/0409; F16H 57/0435; F16H 57/0452; F16H 57/0464; F16H 57/0456
See application file for complete search history.

(56) References Cited

U.S. PATENT DOCUMENTS

2013/0005525 A1  1/2013  Hedman et al.
2015/0128738 A1* 5/2015  Ono ..................... F16H 57/027
                                                          74/339
(Continued)

FOREIGN PATENT DOCUMENTS

CN    1180145 A    4/1998
CN  101038028 A    9/2007
(Continued)

OTHER PUBLICATIONS

International Search Report and Written Opinion for International application No. PCT/EP2018/051443, dated Jul. 18, 2018, 8 pages.
(Continued)

*Primary Examiner* — Zakaria Elahmadi
(74) *Attorney, Agent, or Firm* — Withrow & Terranova, PLLC

(57) ABSTRACT

The invention relates to a lubricating device for controlling lubrication in a stepped transmission comprising a splitter section (10, 20) with an input shaft (I) and a main gear section (30, 40, 50, 60) with an output shaft (O) and a countershaft (C); where the splitter section (10, 20) comprises a first splitter gear set (10) connectable to the input shaft (I) by a first gear shift mechanism (23); and a second splitter gear set (20) connectable to the input shaft (I) by the first gear shift mechanism (23); and connectable to the output shaft (O) by a second gear shift mechanism (33). A lubrication arrangement for the second splitter gear set (20) is arranged to be controlled by the current positions of the first and the second gear shift mechanisms (23, 33); wherein the lubrication arrangement is controlled to at least reduce lubrication when the first and the second gear shift mechanisms (23, 33) are simultaneously connected to or disconnected from the second splitter gear set (20).

20 Claims, 9 Drawing Sheets

(56) References Cited

U.S. PATENT DOCUMENTS

2016/0097445 A1* 4/2016 Jongebloed ......... F16H 57/0471
74/467
2017/0284510 A1* 10/2017 Iwaki ................... F16H 57/031

FOREIGN PATENT DOCUMENTS

| CN | 101082349 A | 12/2007 | |
|---|---|---|---|
| DE | 1813814 A1 | 8/1969 | |
| DE | 19912328 A1 | 9/2000 | |
| DE | 102009004309 A1 | 9/2000 | |
| DE | 102009004309 A1 * | 7/2010 | ......... F16H 57/0434 |
| DE | 102014222549 A1 | 7/2010 | |
| DE | 102015203462 A1 | 9/2015 | |
| JP | 2007205523 A | 8/2007 | |
| JP | 2009180281 A | 8/2009 | |
| JP | 2009299881 A | 12/2009 | |
| WO | 2011/069526 A1 | 12/2009 | |
| WO | WO-2011069526 A1 * | 6/2011 | ............. F16H 3/006 |

OTHER PUBLICATIONS

First Office Action for Chinese Patent Application No. 201880087223. 2, dated Nov. 7, 2022, 13 pages.

* cited by examiner

DEVICE FOR CONTROLLING LUBRICATION IN A STEPPED TRANSMISSION COMPRISING A SPLITTER SECTION

This application is a 35 USC 371 national phase filing of International Application No. PCT/EP2018/051443, filed Jan. 22, 2018, the disclosure of which is incorporated herein by reference in its entirety.

TECHNICAL FIELD

The invention relates to a device for controlling lubrication in a stepped transmission comprising a splitter section.

The invention can be applied in heavy-duty vehicles, such as trucks, articulated trucks, buses and construction equipment, which vehicles may be manned or unmanned. Although the invention will be described with respect to a heavy-duty vehicle, the invention is not restricted to this particular vehicle, but may also be used in other vehicles such as buses, articulated haulers, wheel loaders and other working machines comprising a stepped transmission comprising a splitter section.

BACKGROUND

Gear transmissions in heavy duty vehicles often comprise a manually controllable gearbox with stepped gearing, controlled by a control system, also termed automated manual transmission or automatic mechanically-engaged transmission (AMT). As a rule, AMT gearboxes are lighter and cheaper to manufacture than a dual clutch gearbox. They also have a higher efficiency compared to traditional automatic transmissions. AMT gearboxes are particularly suited for heavy goods vehicles, which are largely used for long distance haulage. This type of AMT gearboxes are usually countershaft inline transmissions and comprise three parts: a splitter section, a main gearbox and a range gear, managed by a common control system.

A countershaft inline transmission comprises an input shaft connected to a source of propulsive power, such as an internal combustion engine, and an output shaft connected to at least one pair of driving wheels via a driveline. The input shaft is arranged coaxially with the output shaft. The transmission further comprises at least one countershaft arranged parallel to the input shaft and the output shaft. Normally, the power is transferred from the input shaft to the countershaft via a primary gear set and on to the output shaft via one of a plurality of selectable secondary gear sets, often referred to as a main gearbox. A range gear can be provided between the output shaft and the driveline.

Some vehicles, e.g., heavy trucks and buses, often require a relatively high number of gears in the transmission. A well-known way to embody this is a splitter design, where there are at least two primary gear sets. These gear sets can selectively transfer power from the input- to the countershaft and are commonly referred to as splitter or splitter gear sets. In one state of operation, one of the primary gear sets is connected to the countershaft in order to transfer power to the main gearbox. The other primary gear set will still be rotated but is not transferring power. This will create load-independent power losses from oil pumping, oil splashing and windage caused by the supply of oil to the inactive primary gear set.

In a further state of operation, the input shaft is rotatably connected directly to the output shaft, which state is referred to as the "direct gear". In long-distance heavy vehicles, the direct gear is normally also the top gear and the most frequently used gear. For best fuel economy, the top gear is usually a direct gear in such vehicles. In the direct gear, none of the gear sets in the main gearbox are active. This reduces the load-dependent power losses in the transmission, which increases the efficiency and improves the fuel consumption. However, although not transferring any propulsive power in the direct gear, the gearwheels in the main gearbox are still rotating. This will create load-independent power losses from oil pumping, oil splashing and windage caused by the supply of oil to the gear wheels. Hence, it is a waste of energy to have the teeth of the gear sets lubricated and cooled all the time when the vehicle operates in the direct gear.

In a transmission of this type it is necessary to provide lubrication and cooling for the gear teeth. Lubrication and cooling of the gear teeth can be embodied either as dip lubrication, wherein a lowermost gearwheel of a gear set is partially below the oil level. Alternatively, a spray lubrication can be provided for one of the gear wheels, whereby a flow of oil is directed onto the gear teeth via at least one nozzle. However, this is only required for the gear sets that are in operation and are transferring power. When a gear set is inactive, the need for lubrication and cooling is negligible, or at least relatively small.

Hence it is desirable to provide an improved method and arrangement for controlling lubrication in an automated manual transmission or countershaft inline in order to overcome the above problems.

SUMMARY

An object of the invention is to provide a method and an arrangement for controlling lubrication of gears in a countershaft inline transmission with a splitter section, in particular the lubrication of splitter gear sets, which arrangement is described in the appended claims.

In the subsequent text, a splitter section is described as comprising a first splitter gear and a second splitter gear. The first and second splitter gears are also referred to as a "low split" (LS) and "high split" (HS), and are used together with a range gear to provide the gearbox with a wider range of gear ratios. The invention relates to a lubricating device for controlled lubrication in a stepped transmission comprising a splitter section, with primary gear sets, and a main gear section, with secondary gear sets. The splitter section comprises an input shaft and the main gear section comprises an output shaft. A countershaft is parallel to the input- and output shafts. The splitter section comprises a first splitter gear set with a first splitter loose gearwheel and a second splitter gear set with a second splitter loose gearwheel. In this context, a loose gearwheel does not transmit power until it is connected to a shaft by a gear shift mechanism. The first splitter loose gearwheel is connectable to the input shaft by a first gear shift mechanism and the second splitter loose gearwheel is alternatively connectable to the input shaft by the first gear shift mechanism and connectable to the output shaft by a second gear shift mechanism. The first and the second gear shift mechanisms are located on opposite sides of the second splitter loose gearwheel. When not connected to transfer power, the first and second splitter loose gearwheels are arranged to rotate freely relative to the input shaft and the output shaft, respectively.

A lubrication arrangement for the second splitter gear set is arranged to be controlled by the positions of the first and the second gear shift mechanisms. These positions are the currently selected positions representing a gear selected by the driver or by an electronic control unit connected to the transmission. The lubrication arrangement is further controlled to at least reduce lubrication when the first and the second gear shift mechanisms are simultaneously connected to or disconnected from the second splitter loose gearwheel.

Lubrication of the second splitter gear set occurs when the positions of the first and the second gear shift mechanisms cause transmission of power in the form of a driving torque between the gearwheels in the second splitter gear set, i.e., between the input- and countershaft or between the counter- and output shaft via the second splitter gear set. This occurs when exactly one of the first and the second gear shift mechanisms is connected to the second splitter loose gearwheel.

However, when no driving torque is transmitted from the second splitter gear set to the countershaft or vice versa, lubrication of the second splitter gear set is reduced or interrupted. This occurs when the first and the second gear shift mechanisms are both connected to the second splitter loose gearwheel, which is then driving the output shaft. In this case, torque is transmitted from the input shaft to the output shaft in a direct gear.

Alternatively, this occurs when the first and the second gear shift mechanisms are both disconnected from the second splitter loose gearwheel, which is then free-wheeling about the output shaft. In this case, torque is transmitted from the input shaft to the output shaft via the first splitter gear set and the countershaft. In this case the transmission torque path bypasses the second splitter gear set. Each gear shift mechanism can have a neutral position, where it is not connected to any gear set, and at least one active position, where it is connected to a gear set. In this example, the first gear shift mechanism has a first active position, in which it connects the first splitter loose gearwheel to the input shaft, and a second active position, in which it connects the second splitter loose gearwheel to the input shaft. The neutral, or inactive, position of the first gear shift mechanism is located between the first and second active positions. Similarly, the second gear shift mechanism has a first active position, in which it connects the second splitter loose gearwheel to the output shaft, and an optional second active position, in which it connects a gearwheel in the main gearbox to the output shaft. The neutral, or inactive, position of the second gear shift mechanism is located between the first and second active positions.

The lubrication arrangement can either be controlled to reduce or to deactivate lubrication when the positions of the first and the second gear shift mechanisms are simultaneously connected to or disconnected from the second splitter loose gearwheel.

The lubrication arrangement can comprise a first and a second supply means for lubricant, where the first and the second supply means comprise first and second sliding closing devices controllable by the first or the second gear shift mechanism. In this context, the term "sliding" is used to describe the displacement of the closing devices relative to openings for supplying lubricant. As the displacement of the closing devices is controlled by the respective gear shift mechanisms, the sliding movement of the gear shift mechanisms parallel to the input and output shafts is transferred to the closing devices. Consequently, the displacement of the closing devices will be substantially parallel to the input and output shafts of the transmission.

According to one example, the first and the second supply means comprise a first and a second supply opening, respectively, in a lubricant gutter connected to a lubricant supply. The lubricant gutter is arranged adjacent a lowermost gear wheel of the gear set making up the second splitter gear set. The first and second sliding closing devices are arranged to at least partially close the first and/or the second opening in response to the positions of the first and second gear shift mechanisms.

According to a further example, the first and the second supply means comprise a first and a second spray nozzle adjacent or below a lowermost gear wheel of the second splitter gear set, which spray nozzles are connected to a lubricant supply. The first and a second sliding closing device are arranged to at least partially close the first and/or the second spray nozzles in response to the positions of the first and second gear shift mechanisms.

The first gear shift mechanism can be mechanically connected to the first closing device by a first sealing device. Similarly, the second gear shift mechanism is mechanically connected to the second closing device by a second sealing device. Such a sealing device is arranged to connect a gear change mechanism to a respective closing device. The sealing devices are arranged to at least partially enclose the second splitter gear set to reduce spray and windage between gear sets on either side of the second splitter gear set.

According to one example, the lubrication arrangement is controlled to be at least reduced when the second splitter loose gearwheel is simultaneously disconnected from the input shaft by the first gear shift mechanism and disconnected from the output shaft by the second gear shift mechanism. In this case the second splitter loose gearwheel is free-wheeling relative to the output shaft and lubrication is not required as the second splitter gear set is not transmitting power. When this condition occurs, the first shift mechanism is arranged to act on the first sliding closing device to at least partially close the first supply means and the second gear shift mechanism is arranged to act on the second sliding closing device to at least partially close the second supply means for as long as the second splitter loose gearwheel is disconnected from both the input shaft and the output shaft.

According to a further example, the lubrication arrangement is controlled to be at least reduced when the second splitter loose gearwheel is simultaneously connected to the input shaft by the first gear shift mechanism and to the output shaft by the second gear shift mechanism. In this case the second splitter loose gearwheel is connected to the input shaft and to the output shaft and lubrication is not required as second splitter gear set is not transmitting power. This gear selection corresponds to the direct gear, in which none of the gear sets in the main gearbox are transmitting power.

When this condition occurs, the first shift mechanism is arranged to act on the first sliding closing device to at least partially close the second supply means and the second gear shift mechanism is arranged to act on the second sliding closing device to at least partially close the first supply means for as long as the second splitter loose gearwheel is connected to both the input shaft and the output shaft.

The first sliding closing device comprises a sliding portion arranged to at least partially close the first supply means when the second splitter loose gearwheel is disconnected from the input shaft and arranged to open the first supply means and at least partially close the second supply means when the second splitter loose gearwheel is connected to the input shaft. Further, the second sliding closing device comprises a sliding portion arranged to at least partially close the second supply means when the second splitter loose gearwheel is disconnected from the output shaft and arranged to at least partially close the first supply means and open the second supply means when the second splitter loose gearwheel is connected to the output shaft.

According to one example, the sliding portions of the first and second closing device each comprise a sealing surface with a through opening that is indexable with the first and the second supply means, respectively.

According to a further example, the sliding portions of the first and second closing device each comprise a cam arranged to act on a first or a second pivoting valve to at least partially close the first or second supply means; wherein the valves are spring loaded towards an open position.

According to a further example, the sliding portions of the first and second closing device each comprise a cam arranged to act on a first or a second pivoting valve to at least partially close the first or second supply means, wherein each valve is spring loaded towards a closed position by first springs and are displaced towards an open position by second springs under the action of either of the first and the second gear shift mechanisms.

Each of the above examples allows the closing devices to at least partially close the supply means, where the supply means comprises a dip lubrication arrangement, such as a lubricant gutter, or lubricant spray nozzles.

In the above examples, it is stated that the closing devices can be arranged to at least partially close the supply means. In some transmissions lubrication may not be required for the second splitter gear set when no power is being transmitted, wherein the supply of lubricant can be closed. In this case the closing devices will close, causing the oil level in a dip lubrication arrangement to fall below the periphery of the lower gearwheel in the second splitter gear set. In a spray lubrication arrangement, the closing devices will simply close or cover the lubricant spray nozzles to prevent the flow of lubricant to the second splitter gear set.

However, other transmissions may require that at least a minimum level of lubricant supply is maintained when the second splitter gear set is not transmitting power. In such cases the closing devices will close partially, causing the oil level in a dip lubrication arrangement to a desired level, but not below the periphery of the lower gearwheel in the second splitter gear set. This can be achieved in a number of different ways, for instance, by off-setting the positions of at least one closing device relative to the supply openings, or by providing the closing devices with through holes, etc. in order to ensure a minimum supply level. The off-set of the positions of at least one closing device relative to the supply openings can be made either in the displacement direction of the closing devices or transverse to this direction. The provision of through holes in the closing devices can be made either by allowing the through holes to index with the supply openings when the closing devices move into their closed positions or by providing grooves or similar in the lower surfaces of the closing devices facing the supply openings.

The invention further relates to a vehicle transmission comprising a lubricating device as described above, and to a vehicle comprising such a transmission.

By the provision of a lubricating device as described above which is controlled by means of a gear shifting process in a countershaft inline transmission, such as an automated manual transmission, an advantage is that the lubricating device is controlled by mechanical operation. A lubricating device of this type is not affected by loss of electrical or hydraulic power. It is also an advantage that the lubricating device comprises relatively few moving parts, making the device robust and simple to maintain.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
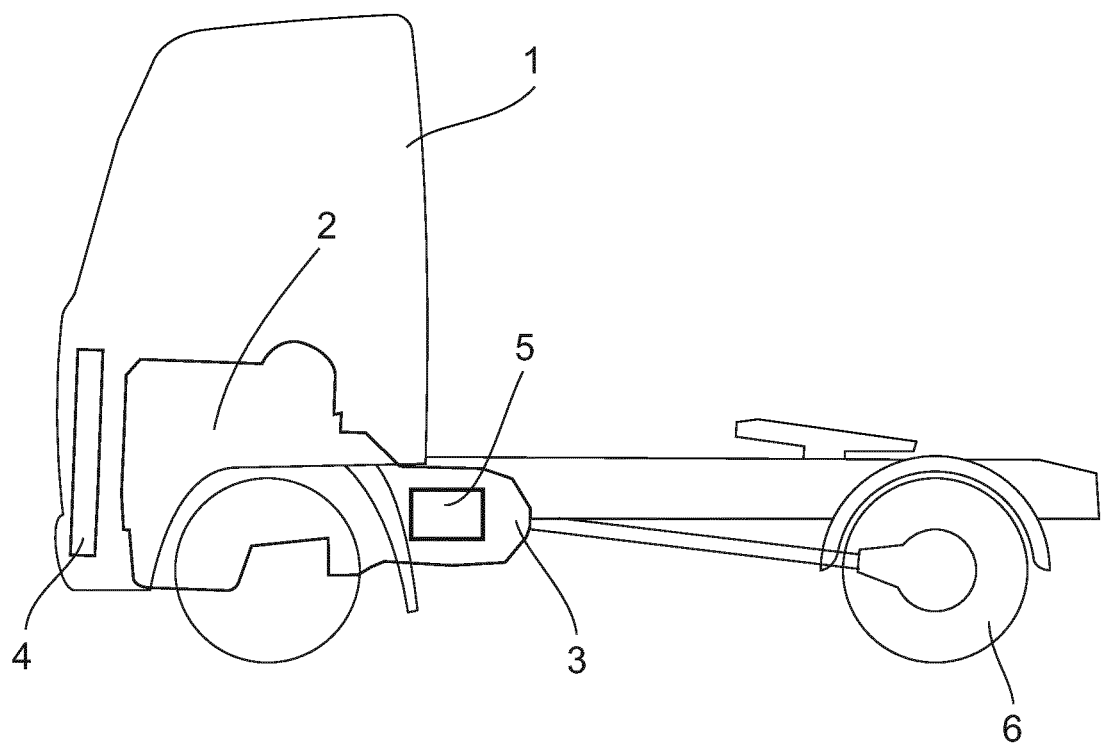
FIG. 1 shows a schematic vehicle provided with a transmission comprising a lubricating device according to the invention.

The schematically indicated vehicle 1 comprises a transmission arrangement 3 comprising a lubricating device according to the invention. The vehicle 1 is provided with an internal combustion engine (ICE) 2 connected to a transmission 3, such as an automated manual transmission (AMT), for transmitting torque to a rear drive axle (not shown). The ICE 2 is connected to a radiator arrangement 4 for cooling engine coolant and oil from the ICE 2. The transmission 3 is controlled by the driver or automatically via an electronic control unit (ECU) 5. The ECU 5 is provided with control algorithms for controlling the transmission independently or in response to gear shifts requested by the driver. Automatic or manually requested gear shifts are implemented by the ECU 5, which is arranged to control gear shifting mechanisms in the gearbox 3. The transmission is controlled to select a gear ratio between the engine 2 and a pair of driven wheels 6.

Figure 2A:
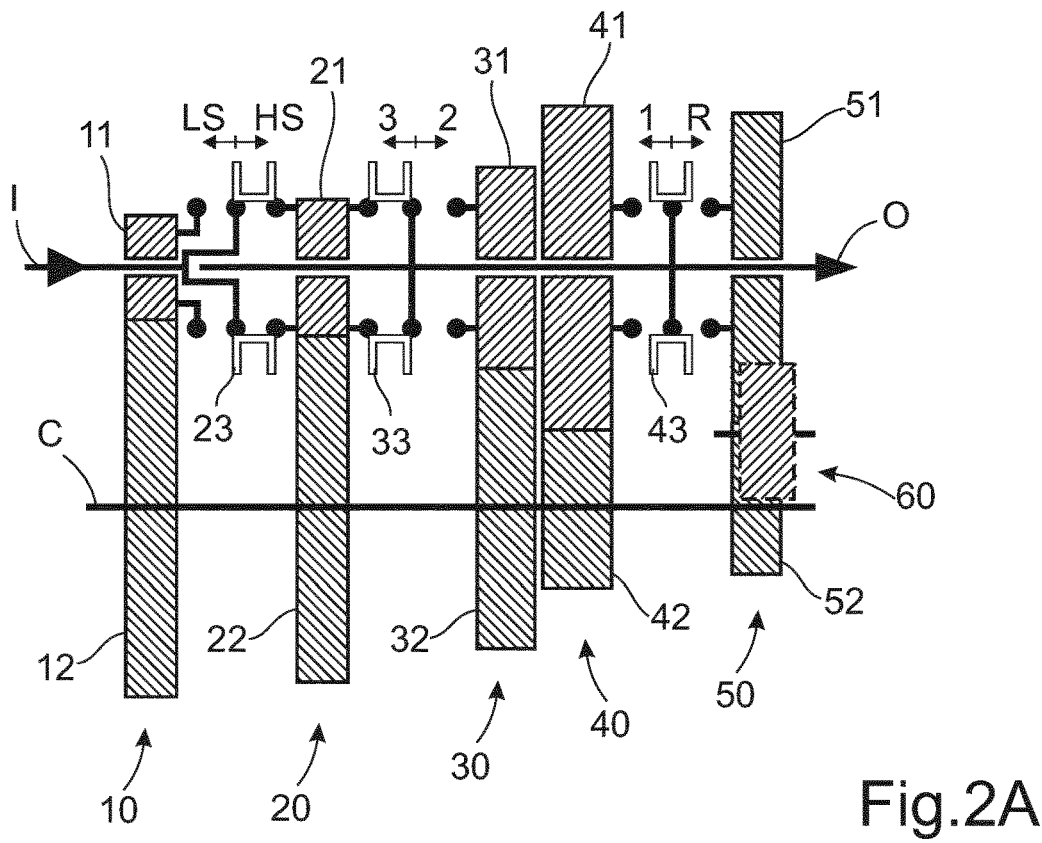
FIG. 2A-2B show a schematic illustration of a transmission suitable for use with a lubricating device according to the invention.
Figure 2B:
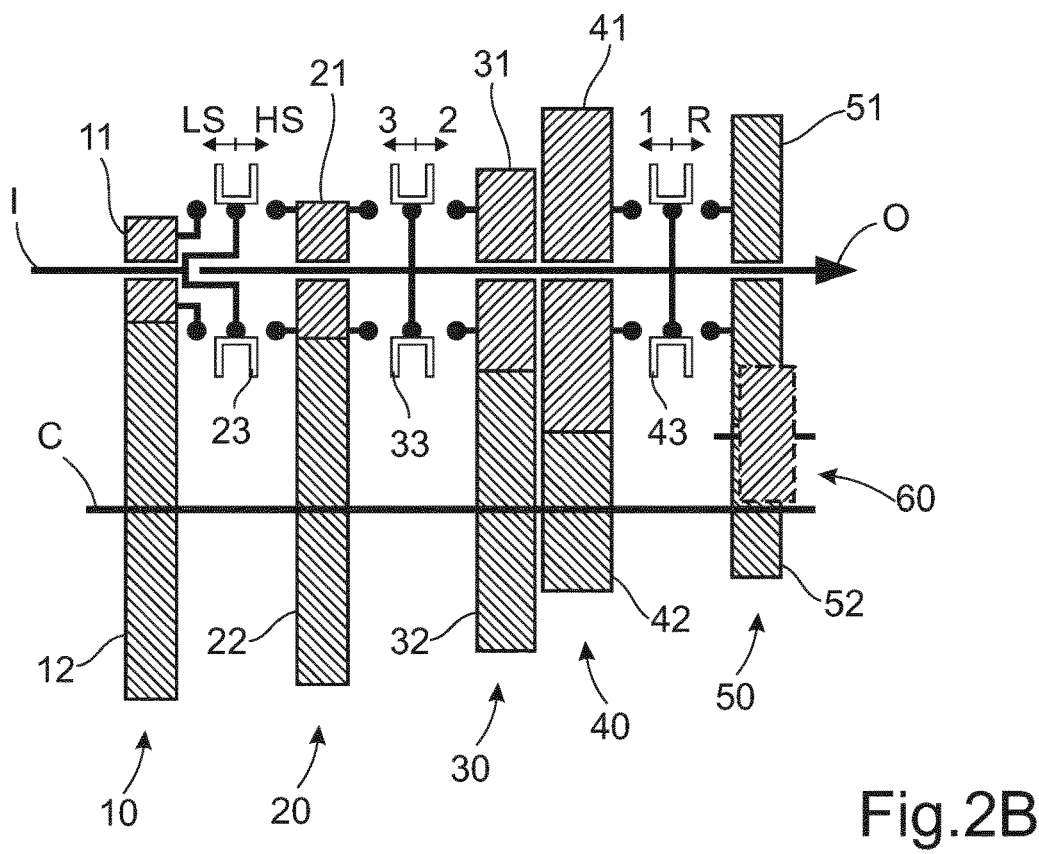

FIGS. 2A-2B show a schematic illustration of a transmission suitable for use with a lubricating device according to the invention. The transmission described in this example is an AMT gearbox of a type referred to as a countershaft inline transmission. The transmission comprises three parts, namely a splitter section 10, 20, a main gearbox 30, 40, 50, 60 and a range gear (not shown), which parts are managed by a common control system (see FIG. 1). The range gear is not included in the example, as it is not relevant for the current invention.

The transmission in FIG. 2A comprises an input shaft I connected to a source of propulsive power, such as an internal combustion engine, and an output shaft O connected to at least one pair of driving wheels via a driveline, as indicated in FIG. 1. The input shaft I is arranged coaxially with the output shaft O. The transmission further comprises a countershaft C arranged parallel to the input shaft I and the output shaft O. Power can be transferred from the input shaft I to the countershaft C via primary gear sets 10, 20 with gearwheels 11, 12; 21, 22 and on to the output shaft O via one of a plurality of selectable secondary gear sets 30, 40, 50 with gearwheels 31, 32; 41, 42; 51, 52, 60. In this example, the splitter section comprises a first splitter gear set 10 and a second splitter gear set 20. Further, the second splitter gear set 20 and a first and a second secondary gear sets 30, 40 are associated with three forward gears, while a third secondary gear set 50 is associated with a reverse gear R. The range gear is provided between the output shaft and the driveline and is not included in the figure.

The splitter section 10, 20 comprises two primary gear sets 10, 20 with gearwheels 11, 12; 21, 22. These gear sets can selectively transfer power from the input shaft I to the countershaft C and will be referred to as splitter gear sets in the subsequent text. In one state of operation, a first splitter loose gearwheel 11 of the first splitter gear set 10 can be connected to the countershaft C in order to transfer power to the countershaft. This connection is achieved by means of a first gear shift mechanism 23, which can be actuated to lock the normally free-wheeling first splitter loose gearwheel 11 of the first splitter gear set 10 to the input shaft I. The other, a corresponding second splitter loose gearwheel 21 of the second splitter gear set 20 is then free-wheeling relative to the output shaft O. In this state of operation, the gearwheels 21, 22 of the second splitter gear set 20 will be rotated but are not transferring power and will not require lubrication.

In a further state of operation, the input shaft I is rotatably connected to the output shaft O, which state is referred to as the "direct gear". This connection is achieved by means of the first gear shift mechanism 23, which can be actuated to lock the normally free-wheeling second splitter loose gearwheel 21 of the second splitter gear set 20 to the input shaft I, and a second gear shift mechanism 33, which can be actuated to lock said gearwheel 21 to the output shaft O. This state is indicated in FIG. 2A. In long-distance heavy vehicles, the direct gear is usually the top gear and the most frequently used gear. In the direct gear, none of the secondary gear sets 30, 40, 50 are active. This reduces the load-dependent power losses in the transmission, which increases the efficiency and improves the fuel consumption. However, although not transferring any propulsive power in the direct gear, the gearwheels 21, 22 of the second splitter gear set 20 are still rotating. This will create load-independent power losses from oil splashing, oil pumping and windage caused by the supply of oil to the gear wheels if the gear sets are lubricated and cooled all the time when the vehicle operates in the direct gear.

A similar situation occurs when the first and the second gear shift mechanisms 23, 33 are both disconnected from the second splitter loose gearwheel 21. This can occur when both the first and the second gear shift mechanisms 23, 33 are in their neutral, or inactive, positions as shown in FIG. 2B. Alternatively, this occurs when at least the first gear shift mechanism 23 is actuated into connection with gear wheel 11 in the first splitter gear set 10, wherein torque is transmitted from the input shaft I to the output shaft O via the first splitter gear set 10 and the countershaft C. In this case the transmission torque path bypasses the second splitter gear set 20.

Each gear shift mechanism 23, 33, 43 in the transmission has a neutral position, where it is not connected to any gear set, and at least one active position, where it is connected to a gear set. In this example, the first gear shift mechanism 23 has a first active position LS (low split), in which it connects the first splitter loose gearwheel 11 to the input shaft I (not shown), and a second active position HS (high split), in which it connects the second splitter loose gearwheel 21 to the input shaft I (FIG. 2A). The neutral, or inactive, position of the first gear shift mechanism 23 is located between the first and second active positions (FIG. 2B).

Similarly, the second gear shift mechanism 33 has a first active position, in which it connects the second splitter loose gearwheel 21 to the output shaft O (FIG. 2A), and a second active position, in which it connects a further gearwheel 31 to the output shaft O (not shown). The neutral, or inactive, position of the first gear shift mechanism 33 is located between the first and second active positions (FIG. 2B).

Figure 3A:
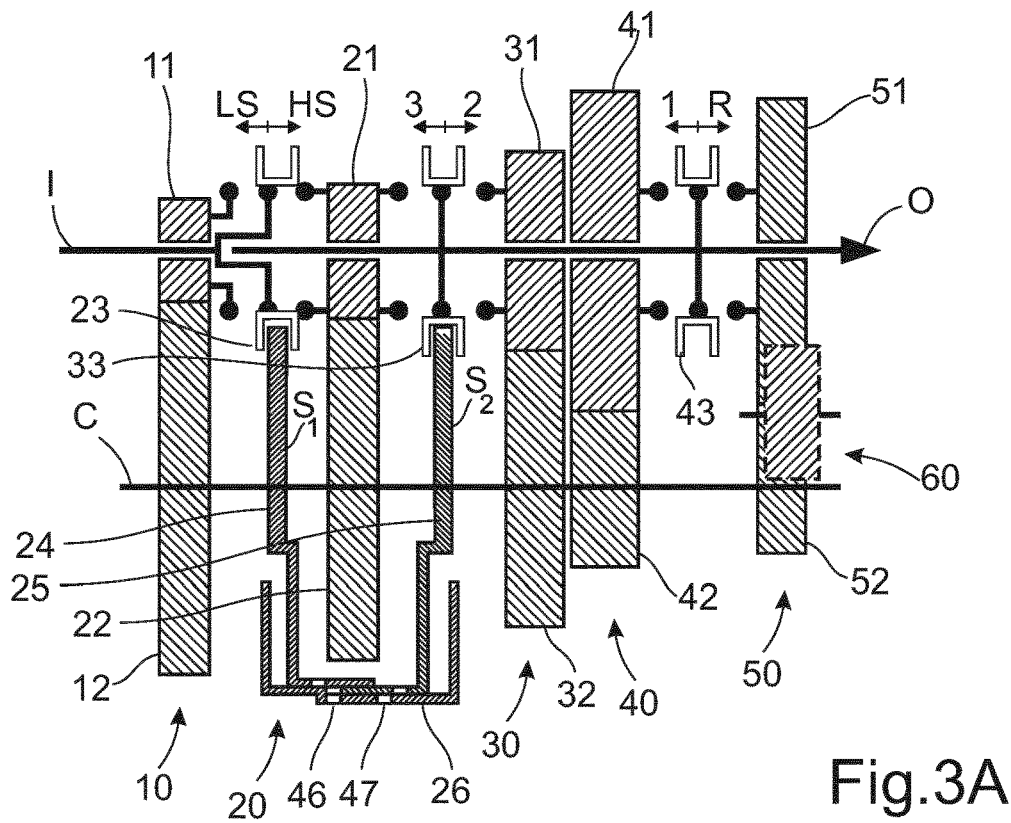
FIG. 3A-3B show a schematic illustration of a transmission comprising a lubricating device according to a first embodiment of the invention.
Figure 3B:
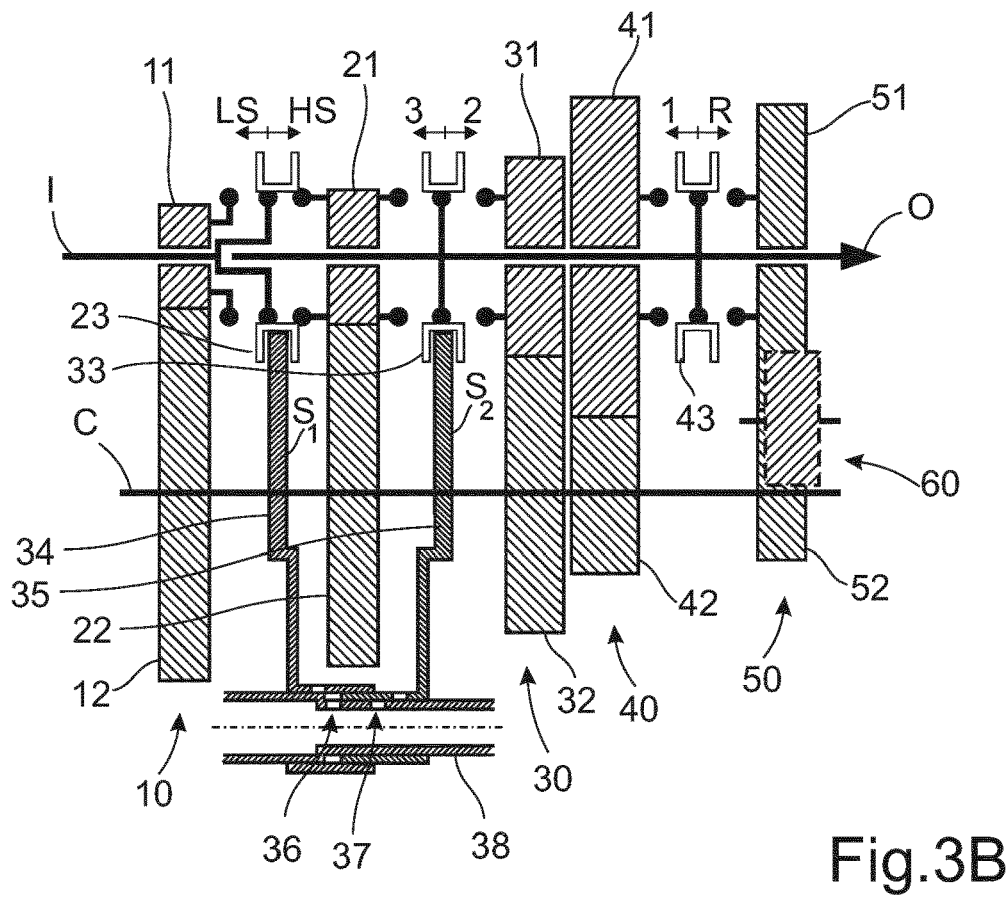

FIGS. 3A-3B show a schematic illustration of a transmission comprising a lubricating device according to a first embodiment of the invention. In a transmission of this type it is necessary to provide lubrication and cooling for the gear teeth. FIG. 3A shows an example of lubrication and cooling of the gear teeth embodied as dip lubrication, wherein a lowermost gearwheel 22 of second splitter gear set 20 is partially below the oil level in a gutter 26 type of oil supply.

The lubrication arrangement comprises a first and a second supply means in the form of a first and a second opening 46, 47 for lubricant supplied from a source of lubricant under pressure (not shown). The first and the second supply means further comprise first and second sliding closing devices 24, 25 controllable by the first or the second gear shift mechanism 23, 33, respectively. The first or the second gear shift mechanism 23, 33 are mechanically connected to the first and second sliding closing device 24, 25. According to one example, the interconnecting sliding portions can form sealing devices S1, S2 extending between the first and second splitter gear sets 10, 20 and between the second splitter gear set 20 and the adjacent gear set 30, respectively. In this way splashing of lubricant and windage between rotating parts can be reduced. In this context, the term "sliding" is used to describe the displacement of the closing devices 24, 25 relative to the first and the second supply openings 46, 47. As the displacement of the closing devices 24, 25 is controlled by the respective gear shift mechanisms 23, 33, the sliding movement of the gear shift mechanisms parallel to the input and output shafts is transferred to the closing devices. Consequently, the displacement of the closing devices 24, 25 in the gutter 26 will be substantially parallel to the input and output shafts of the transmission. Note that the mechanism described here is only one example of a suitable solution. Other types of mechanisms and movements can be equally suitable as recognized by a skilled person.

FIG. 3A shows a state of operation where the second splitter loose gear wheel 21 is disconnected from both of the gear shift mechanisms 23, 33. In this state the gear set 21, 22 is not transferring power and the need for lubrication and cooling is negligible, or at least relatively small. Consequently, the openings 46, 47 for supplying lubricant to the gutter 26 are closed by the closing devices 24, 25.

Alternatively, a spray lubrication can be provided for the gear wheel, as shown in FIG. 3B, whereby lubricant is directed onto the gear teeth via nozzles 36, 37 supplied from conduit 38 connected to a source of lubricant under pressure (not shown).

FIGS. 3A and 3B show the same state of operation of the gears as in FIG. 2B. The first and the second supply means further comprise first and second sliding closing devices 34, 35 controllable by the first or the second gear shift mechanism 23, 33, respectively. The first or the second gear shift mechanism 23, 33 are mechanically connected to the first and second sliding closing device 34, 35. According to one example, the interconnecting sliding portions can form sealing devices S1, S2 extending between the first and second splitter gear sets 10, 20 and between the second splitter gear set 20 and the adjacent gear set 30, respectively. In this way splashing and pumping of lubricant and windage between rotating parts can be reduced. In this context, the term "sliding" is used to describe the displacement of the closing devices 34, 35 relative to the first and the second supply openings 36, 37. As the displacement of the closing devices 34, 35 is controlled by the respective gear shift mechanisms 23, 33, the sliding movement of the gear shift mechanisms parallel to the input and output shafts is transferred to the closing devices. Consequently, the displacement of the closing devices 34, 35 relative to the nozzles 36, 37 will be substantially parallel to the input and output shafts of the transmission.

FIG. 3B shows a state of operation where the second splitter loose gearwheel 21 is disconnected from both of the gear shift mechanisms 23, 33. In this state the gearwheels 21, 22 are rotating but are not transferring power and the need for lubrication and cooling is negligible, or at least relatively small. Consequently, the nozzles 36, 37 for supplying lubricant to the second splitter gear set 20 are closed by the closing devices 34, 35.

FIGS. 4A-4I show a schematic illustration of the control of the closing devices in FIG. 3A. These figures show the lower gear wheel 22 of the second splitter gear set 20 positioned for dip lubrication in the gutter 26. The first gear shift mechanism, schematically indicated by the arrow 23, is connected to a first closing device 24, while the second gear shift mechanism, schematically indicated by the arrow 33, is connected to a second closing device 25. The gutter 26 is provided with fixed first and second openings 46, 47, which are selectively opened or closed by the closing devices 24, 25. The first closing device 24 has a first opening 44 that can be indexed with the first opening 46 in the gutter 26 for opening or closing the supply of lubricant. Similarly, the second closing device 25 has a second opening 45 that can be indexed with the second opening 47 in the gutter 26 for opening or closing the supply of lubricant. The closing devices can be arranged to close, or at least reduce, the lubricant supply.

Figure 4A:
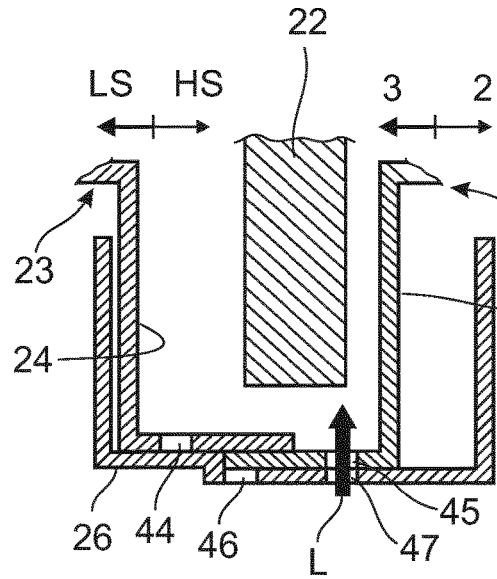
FIG. 4A-4I show a schematic illustration of the control of the closing devices in FIG. 3A.

FIG. 4A shows an operating state where the first gear shift mechanism 23 is located in its first active position LS, connecting the first splitter loose gearwheel (not shown) to the input shaft, and the second gear shift mechanism 33 is located in its first active position, connecting the second splitter loose gearwheel to the output shaft in order to utilize the second splitter gear set as a third transmission gear (indicated by "3"). In this state, the second splitter gear set transmits power from the counter shaft to the output shaft, whereby lubrication is required. In this example, the second closing device 25 is arranged to cover and close the first opening 46 in the gutter 26. At the same time, the second opening 45 in the second closing device 25 is indexed with the second opening 47 in the gutter 26, allowing lubricant to be supplied as indicated by the arrow L.

Figure 4B:
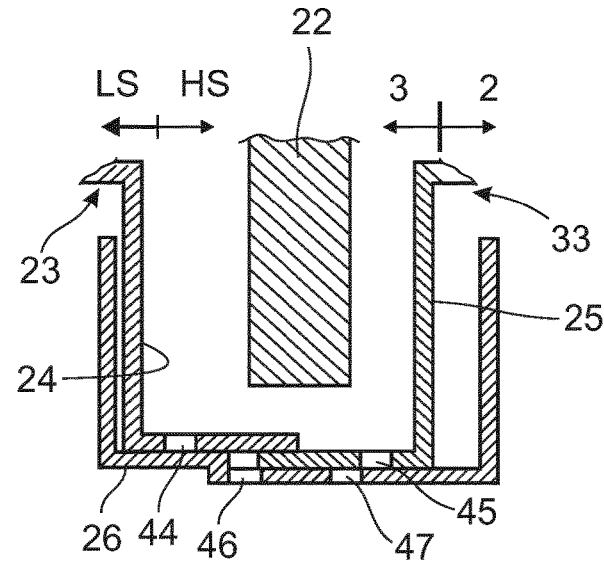

FIG. 4B shows an operating state where the first gear shift mechanism 23 is located in its first active position LS, connecting the first splitter loose gearwheel (not shown) to the input shaft, and the second gear shift mechanism 33 is located in its neutral position, disconnecting the second splitter loose gearwheel from the output shaft. In this state, the second splitter gear set is not transmitting power from the counter shaft to the output shaft, whereby lubrication is not required. In this example, the second closing device 25 is arranged to cover and close the first opening 46 in the gutter 26. At the same time, the second closing device 25 is arranged to cover and close the second opening 47 in the gutter 26, thereby preventing lubricant supply.

Figure 4C:
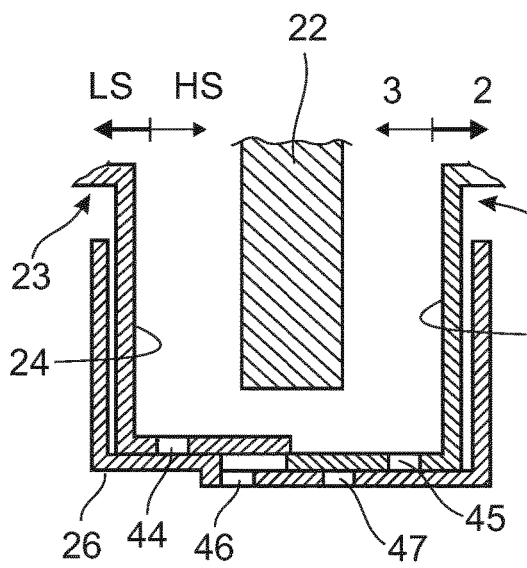

FIG. 4C shows an operating state where the first gear shift mechanism 23 is located in its first active position LS, connecting the first splitter loose gearwheel (not shown) to the input shaft, and the second gear shift mechanism 33 is located in its second active position, connecting an adjacent gear set (see FIG. 3A; "30") to the output shaft in order to select a second transmission gear (indicated by "2"). In this state, the second splitter gear set is not transmitting power from the counter shaft to the output shaft, whereby lubrication is not required. In this example, the first closing device 24 is arranged to cover and close the first opening 46 in the gutter 26. At the same time, the second closing device 25 is arranged to cover and close the second opening 47 in the gutter 26, thereby preventing lubricant supply.

Figure 4D:
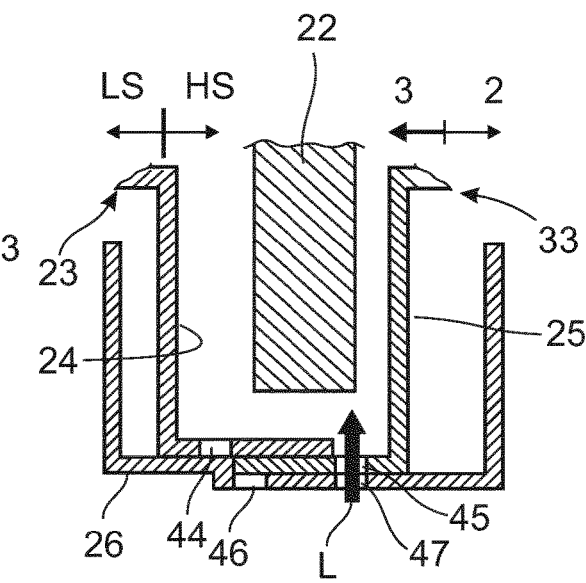

FIG. 4D shows an operating state where the first gear shift mechanism 23 is located in its neutral position, disconnected from both the first splitter loose gearwheel (not shown) and the second splitter loose gearwheel, and the second gear shift mechanism 33 is located in its first active position, connecting the second splitter loose gearwheel to the output shaft in order to utilize the second splitter gear set as a third transmission gear. In this state, the second splitter gear set can transmit power from the counter shaft to the output shaft, whereby lubrication is required. In this example, the second closing device 25 is arranged to cover and close the first opening 46. At the same time, the second opening 45 in the second closing device 25 is indexed with the second opening 47 in the gutter 26, allowing lubricant to be supplied as indicated by the arrow L.

Figure 4E:
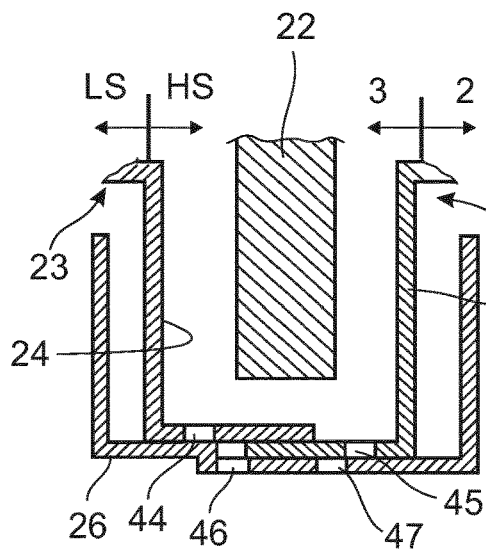

FIG. 4E shows an operating state where both the first gear shift mechanism 23 and the second gear shift mechanism 33 are located in their neutral positions, disconnecting the second splitter loose gearwheel from the input shaft and the output shaft. In this state, the second splitter gear set is not transmitting power, whereby lubrication is not required. In this example, the first closing device 24 is arranged to cover and close the first opening 46 in the gutter 26. At the same time, the second closing device 25 is arranged to cover and close the second opening 47 in the gutter 26, thereby preventing lubricant supply.

Figure 4F:
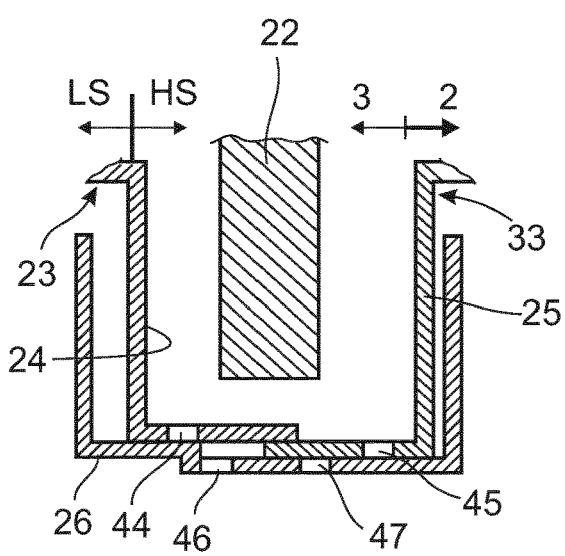

FIG. 4F shows an operating state where the first gear shift mechanism 23 is located in its neutral position, disconnected from both the first splitter loose gearwheel (not shown) and the second splitter loose gearwheel, and the second gear shift mechanism 33 is located in its first active position, connecting an adjacent gear set (see FIG. 3A; "30") to the output shaft in order to select a second transmission gear (indicated by "2"). In this state, the second splitter gear set is not transmitting power, whereby lubrication is not required. In this example, the first closing device 24 is arranged to cover and close the first opening 46 in the gutter 26. At the same time, the second closing device 25 is arranged to cover and close the second opening 47 in the gutter 26, thereby preventing lubricant supply.

Figure 4G:
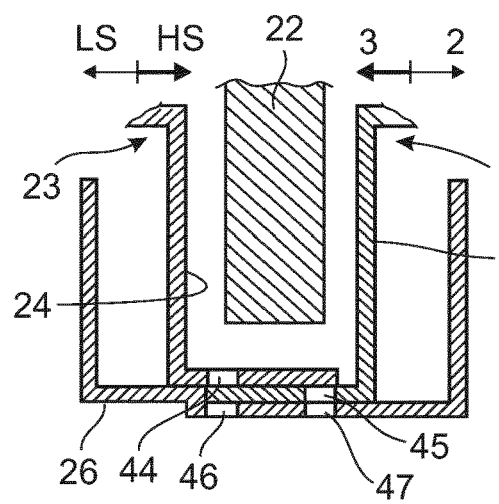

FIG. 4G shows an operating state where the first gear shift mechanism 23 is located in its second active position HS, connecting the second splitter loose gearwheel to the input shaft, and the second gear shift mechanism 33 is located in its first active position, connecting the second splitter loose gearwheel to the output shaft in order to place the transmission in the direct gear. In this state, the second splitter gear set is not transmitting driving power to or from the counter shaft, whereby lubrication is not required. In this example, the second closing device 25 is arranged to cover and close the first opening 46 in the gutter 26. At the same time, the second closing device 25 is arranged to cover and close the second opening 47 in the gutter 26, thereby preventing lubricant supply.

Figure 4H:
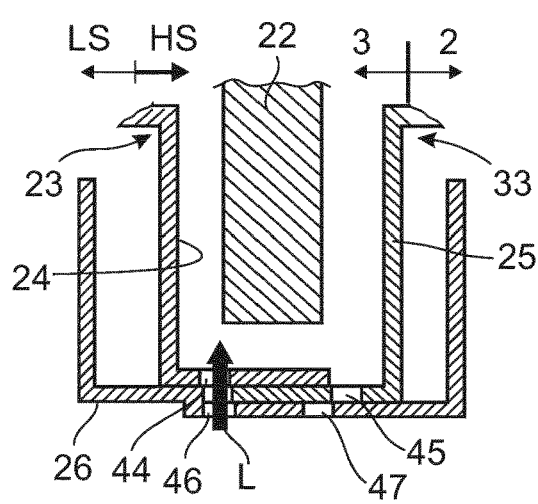

FIG. 4H shows an operating state where the first gear shift mechanism 23 is located in its second active position HS, connecting the second splitter loose gearwheel to the input shaft, and the second gear shift mechanism 33 is located in its neutral position, disconnecting it from both the second splitter gear set and the adjacent gear set. In this state, the second splitter loose gearwheel transmits power from the input shaft to the counter shaft, whereby lubrication is required. In this example, the second closing device 25 is arranged to cover and close the second opening 47 in the gutter 26. At the same time, the first opening 44 in the first closing device 24 is indexed with the first opening 46 in the gutter 26, allowing lubricant to be supplied as indicated by the arrow L.

Figure 4I:
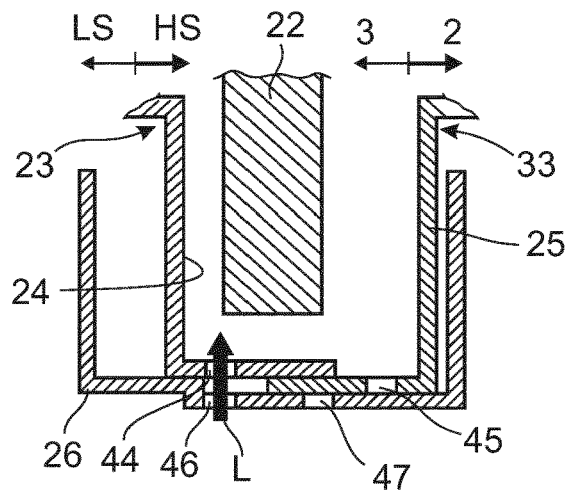

FIG. 4I shows an operating state where the first gear shift mechanism 23 is located in its second active position HS, connecting the second splitter loose gearwheel to the input shaft, and the second gear shift mechanism 33 is located in its second active position, connecting an adjacent gear set (see FIG. 3A; "30") to the output shaft in order to select a second transmission gear (indicated by "2"). In this state, the second splitter gear set transmits power from the input shaft to the counter shaft, whereby lubrication is required. In this example, the second closing device 25 is arranged to cover and close the second opening 47. At the same time, the first opening 44 in the first closing device 24 is indexed with the second opening in the gutter 26, allowing lubricant to be supplied as indicated by the arrow L.

From the above examples, it can be seen that the first and second closing devices 24, 25 are displaced by the first and second gear shift mechanisms 23, 33, respectively, in order to at least reduce the supply of lubricant to the second splitter gear set when the first and the second gear shift mechanisms are simultaneously connected to or disconnected from the second splitter gear set. This occurs when both gear shift mechanisms are simultaneously connected to the second splitter loose gearwheel, operating the transmission in direct gear, or simultaneously disconnected from the second splitter loose gearwheel, which is then free-wheeling relative to the output shaft.

FIGS. 5A-5D show a schematic illustration of a transmission comprising a lubricating device according to a second embodiment of the invention. These figures show the lower gear wheel 22 of the second splitter gear set positioned for dip lubrication in a gutter 53. The first gear shift mechanism, schematically indicated by the arrow 23, is connected to a first closing device 24', while the second gear shift mechanism, schematically indicated by the arrow 33, is connected to a second closing device 25'. The gutter 53 is provided with fixed first and second openings 56, 57, which are selectively opened or closed by the closing devices 24', 25'. The sliding portions of the first and second closing devices 24', 25' each comprise a first and second cam 24a', 25a' arranged to act on a first or a second pivoting valve 54, 55 to close the first or second openings 56, 57 of the supply means. The pivoting valves 54, 55 are spring loaded towards an open position by first and second suitable resilient elements 58, 59, such as coil springs.

Figure 5A:
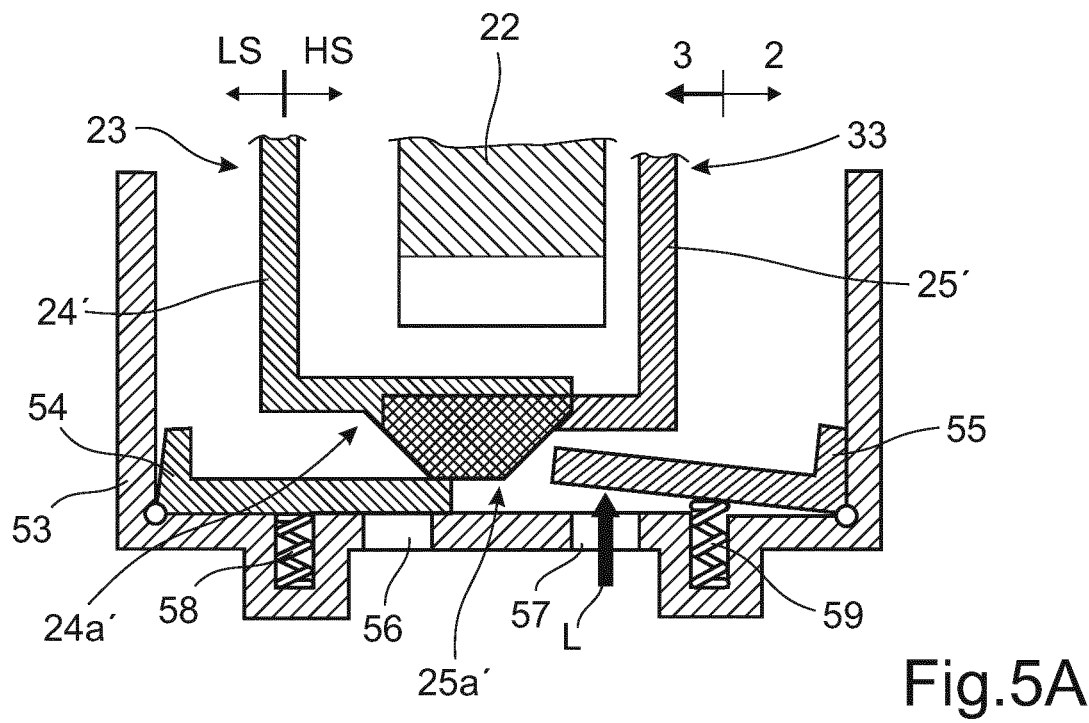
FIG. 5A-5D show a schematic illustration of a transmission comprising a lubricating device according to a second embodiment of the invention.

FIG. 5A shows an operating state where the first gear shift mechanism 23 is located in its neutral position, disconnected from both the first splitter loose gearwheel (not shown) and the second splitter loose gearwheel, and the second gear shift mechanism 33 is located in its first active position, connecting the second splitter loose gearwheel to the output shaft in order to utilize the second splitter gear set as a third transmission gear. In this state, the second splitter gear set can transmit power from the counter shaft to the output shaft, whereby lubrication is required. In this example, the cam 24a' on the first closing device 24', as well as the cam 25a' on the second closing device 25' are arranged to act on and close the first pivoting valve 54 and the first opening 56 in the gutter 53. At the same time, the second pivoting valve 55 is biased towards its open position by the resilient element 59 to uncover the second opening 57 in the gutter 53, allowing lubricant to be supplied as indicated by the arrow L.

Figure 5B:
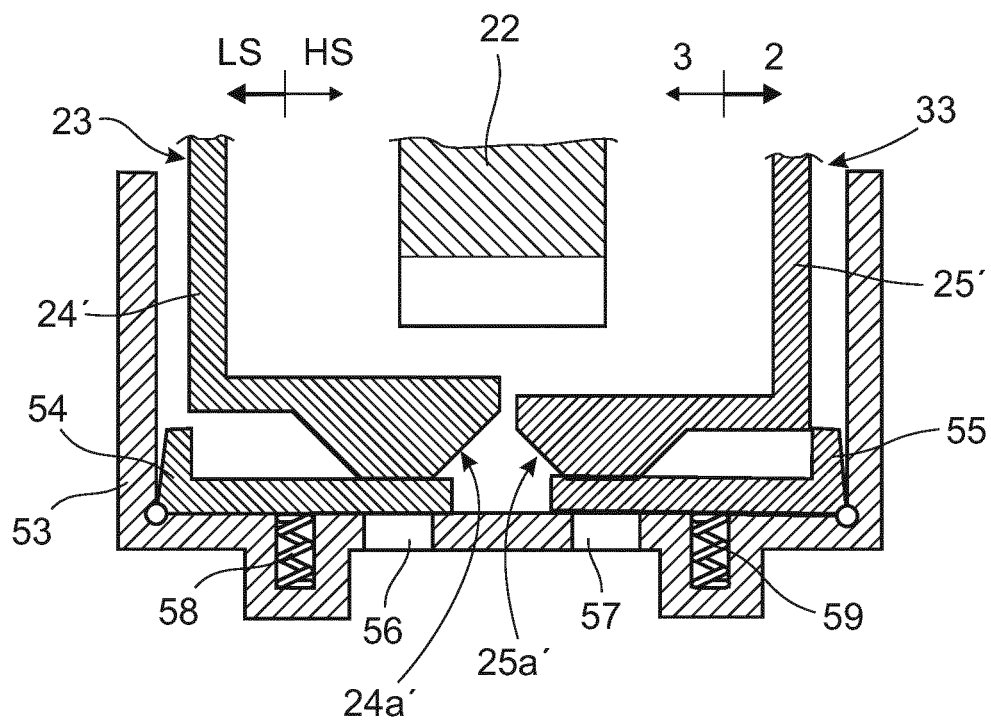

FIG. 5B shows an operating state where the first gear shift mechanism 23 is located in its first active position LS, connecting the first splitter loose gearwheel (not shown) to the input shaft, and the second gear shift mechanism 33 is located in its second active position, connecting an adjacent gear set (see FIG. 3A; "30") to the output shaft in order to select a second transmission gear (indicated by "2"). In this state, the second splitter gear set is not transmitting power from the counter shaft to the output shaft, whereby lubrication is not required. In this example, the cam 24a' on the first closing device 24' is arranged to act on and close the first pivoting valve 54 and the first opening 56 in the gutter 53. At the same time, the cam 25a' on the second closing device 25' is arranged to act on and close the second pivoting valve 55 and the first opening 57 in the gutter 53, thereby preventing lubricant supply.

Figure 5C:
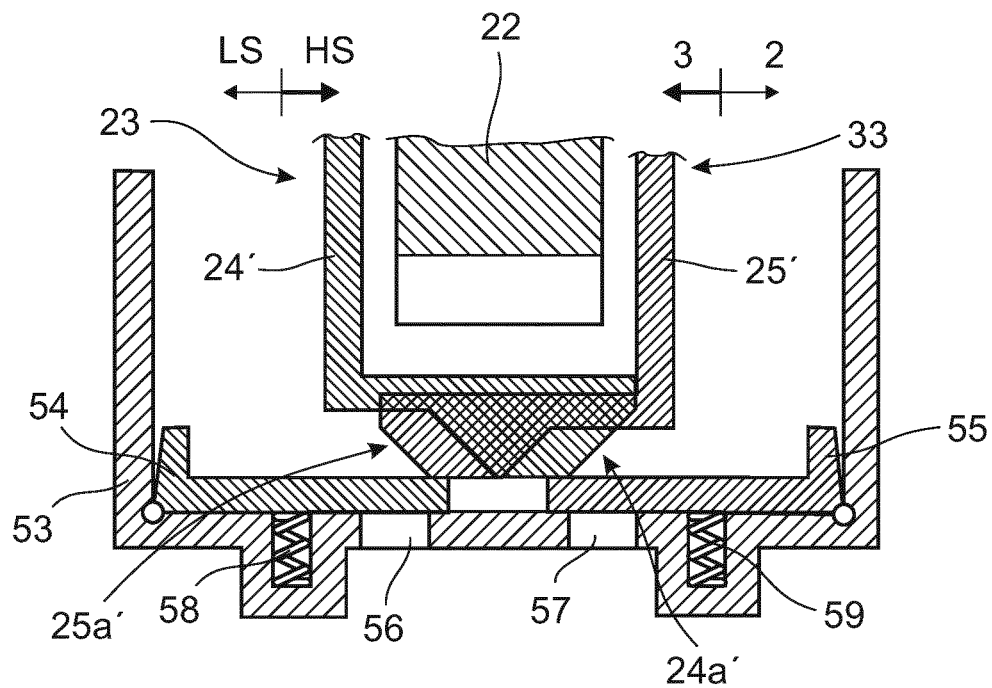

FIG. 5C shows an operating state where the first gear shift mechanism 23 is located in its second active position HS, connecting the second splitter loose gearwheel to the input shaft, and the second gear shift mechanism 33 is located in its first active position, connecting the second splitter loose gearwheel to the output shaft in order to place the transmission in the direct gear. In this state, the second splitter gear set is not transmitting power, whereby lubrication is not required. In this example, the cam 24a' on the first closing device 24' is arranged to act on and close the second pivoting valve 55 and the second opening 57 in the gutter 53. At the same time, the cam 25a' on the second closing device 25' is arranged to act on and close the first pivoting valve 54 and the first opening 56 in the gutter 53, thereby preventing lubricant supply.

Figure 5D:
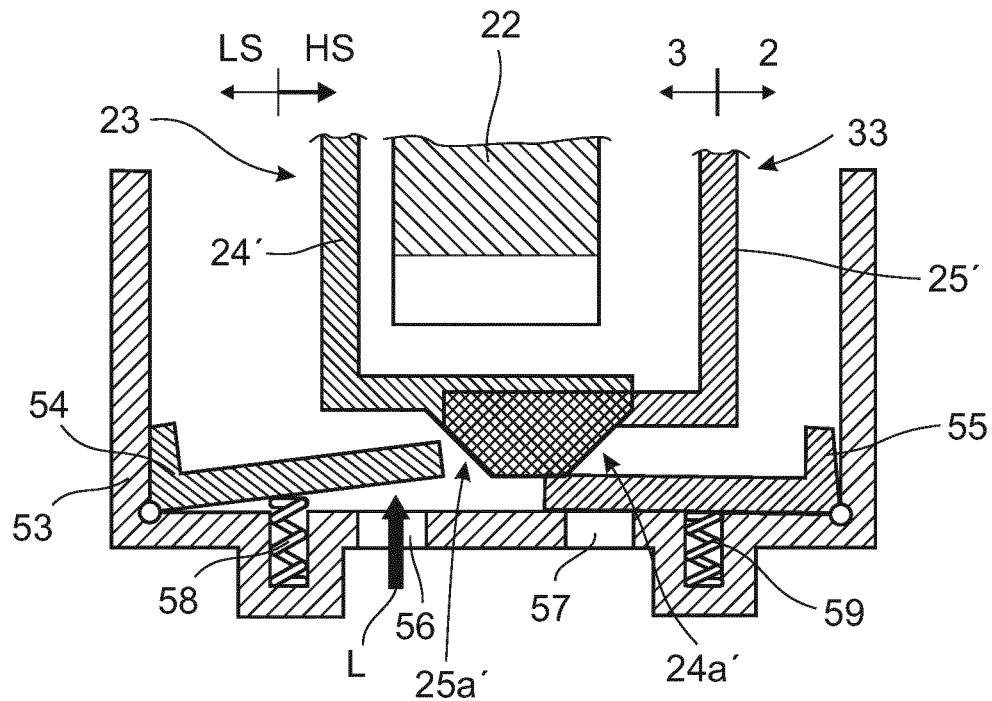

FIG. 5D shows an operating state where the first gear shift mechanism 23 is located in its second active position HS, connecting the second splitter loose gearwheel to the input shaft, and the second gear shift mechanism 33 is located in its neutral position, disconnecting it from both the second splitter loose gearwheel and the adjacent gear set. In this state, the second splitter gear set can transmit power from the input shaft to the counter shaft, whereby lubrication is required. In this example, the cam 24a' on the first closing device 24', as well as the cam 25a' on the second closing device 25' are arranged to act on and close the second pivoting valve 55 and the second opening 57 in the gutter 53. At the same time, the first pivoting valve 54 is biased towards its open position by the resilient element 58 to uncover the first opening 56 in the gutter 53, allowing lubricant to be supplied as indicated by the arrow L. Note that the mechanism described here is only one example of a suitable solution. Other types of mechanisms and movements can be equally suitable as recognized by a skilled person.

FIGS. 6A-6D show a schematic illustration of a transmission comprising a lubricating device according to a third embodiment of the invention. These figures show the lower gear wheel 22 of the second splitter gear set positioned for dip lubrication in a gutter 63. The first gear shift mechanism, schematically indicated by the arrow 23, is connected to a first closing device 24", while the second gear shift mechanism, schematically indicated by the arrow 33, is connected to a second closing device 25". The gutter 63 is provided with fixed first and second openings 66, 67, which are selectively opened or closed by the closing devices 24", 25". The sliding portions of the first and second closing devices 24", 25" each comprise a first and second cam 24a", 25a" arranged to act on a first or a second pivoting valve 64, 65 to close the first or second openings 66, 67 of the supply means. The pivoting valves 64, 65 are spring loaded towards a closed position by first and second suitable resilient elements 68a, 69a, such as coil springs, acting between the gutter 64 and the respective pivoting valves 64, 65. The first and second closing devices 24", 25" each comprise first and second resilient elements 68b, 69b, such as coil springs, having a higher spring constant than the resilient elements 68a, 69a connected to the pivoting valves 64, 65. When the first and/or the second closing device 24", 25" is actuated towards the second splitter gear set, their first and second resilient elements 68b, 69b are arranged to act on the pivoting valves 64, 65 to counteract the closing force of the respective resilient element 68a, 69a connected to the pivoting valves 64, 65 in order to open the first and/or the second pivoting valve 64, 65.

Figure 6A:
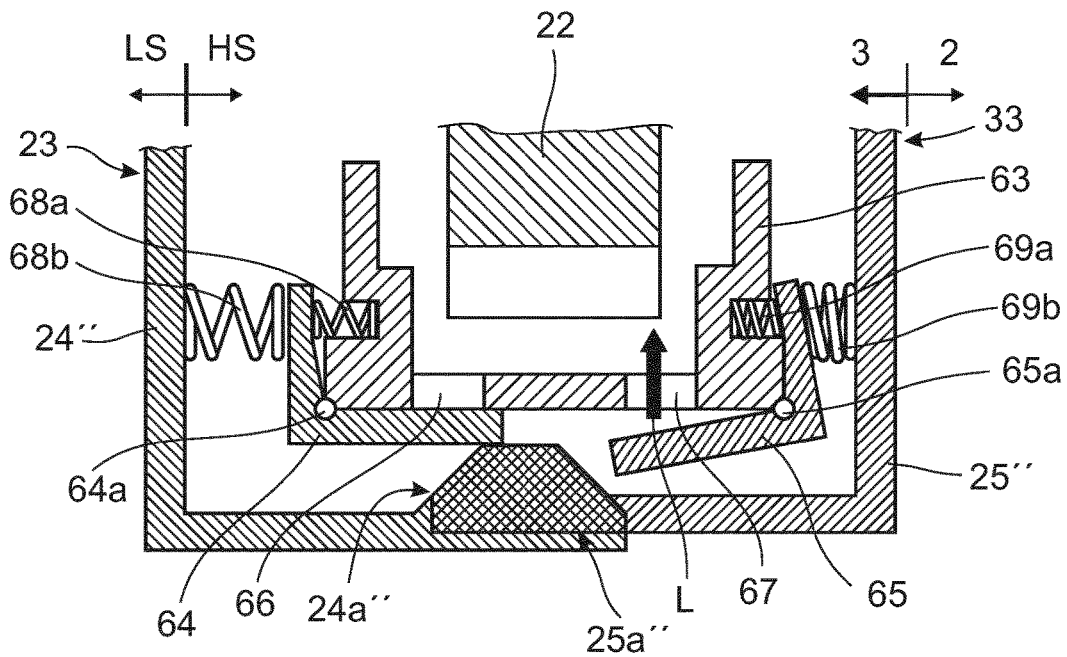
FIG. 6A-6D show a schematic illustration of a transmission comprising a lubricating device according to a third embodiment of the invention.

FIG. 6A shows an operating state where the first gear shift mechanism 23 is located in its neutral position, disconnected from both the first splitter loose gearwheel (not shown) and the second splitter loose gearwheel, and the second gear shift mechanism 33 is located in its first active position, connecting the second splitter loose gearwheel to the output shaft in order to utilize the second splitter gear set as a third transmission gear. In this state, the second splitter gear set can transmit power from the counter shaft to the output shaft, whereby lubrication is required. In this example, the cam 24a" on the first closing device 24", as well as the cam 25a" on the second closing device 25" are arranged to act on the first pivoting valve 64 and the first opening 66 in the gutter 63 to maintain the first pivoting valve closed. In this position, the first resilient element 68b on the first closing device 24" is located adjacent the first pivoting valve 64, but is not exerting a force in the opening direction of the valve. At the same time, the second resilient element 69b on the second closing device 25" is exerting a force in the opening direction of the second pivoting valve 65 sufficient to overcome the closing force of the resilient element 69a connected to the second pivoting valve 65. The second pivoting valve 65 is displaced towards its open position by the resilient element 69b on the second closing device 25" to uncover the second opening 67 in the gutter 63, allowing lubricant to be supplied.

Figure 6B:
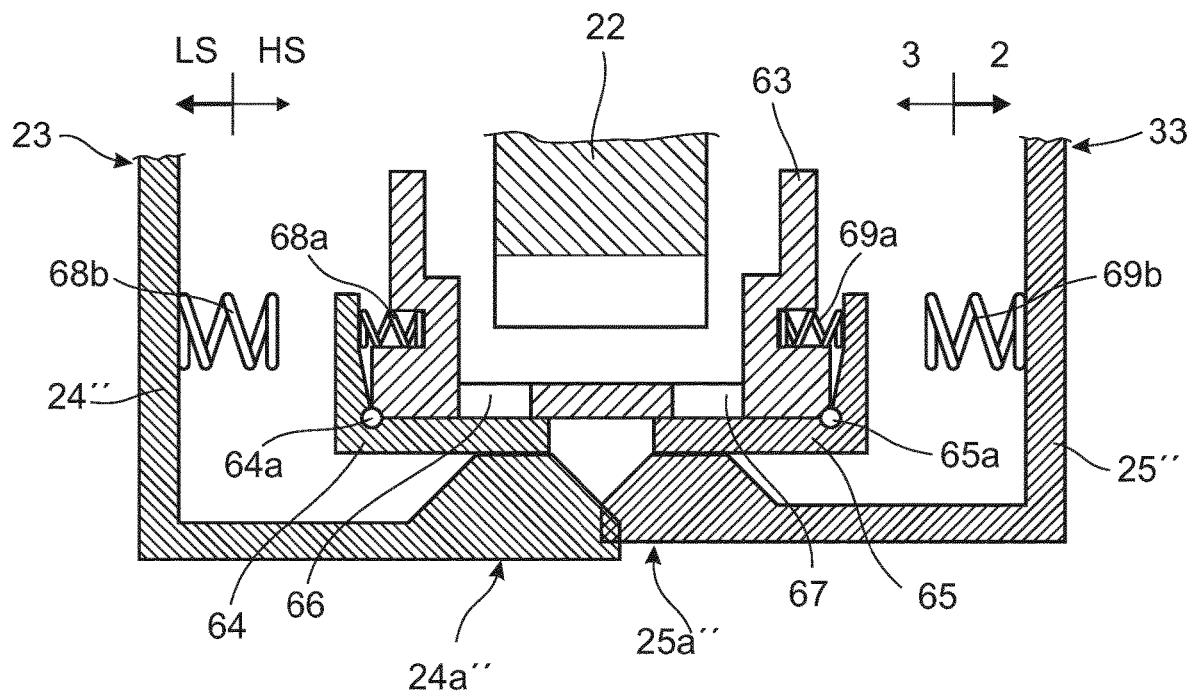

FIG. 6B shows an operating state where the first gear shift mechanism 23 is located in its first active position LS, connecting the first splitter loose gearwheel (not shown) to the input shaft, and the second gear shift mechanism 33 is located in its second active position, connecting an adjacent gear set (see FIG. 3A; "30") to the output shaft in order to select a second transmission gear (indicated by "2"). In this state, the second splitter gear set is not transmitting power, whereby lubrication is not required. In this example, the cam 24a" on the first closing device 24" is arranged to act on and close the first pivoting valve 64 and the first opening 66 in the gutter 63. At the same time, the cam 25a" on the second closing device 25" is arranged to act on and close the second pivoting valve 65 and the first opening 67 in the gutter 63, thereby preventing lubricant supply.

Figure 6C:
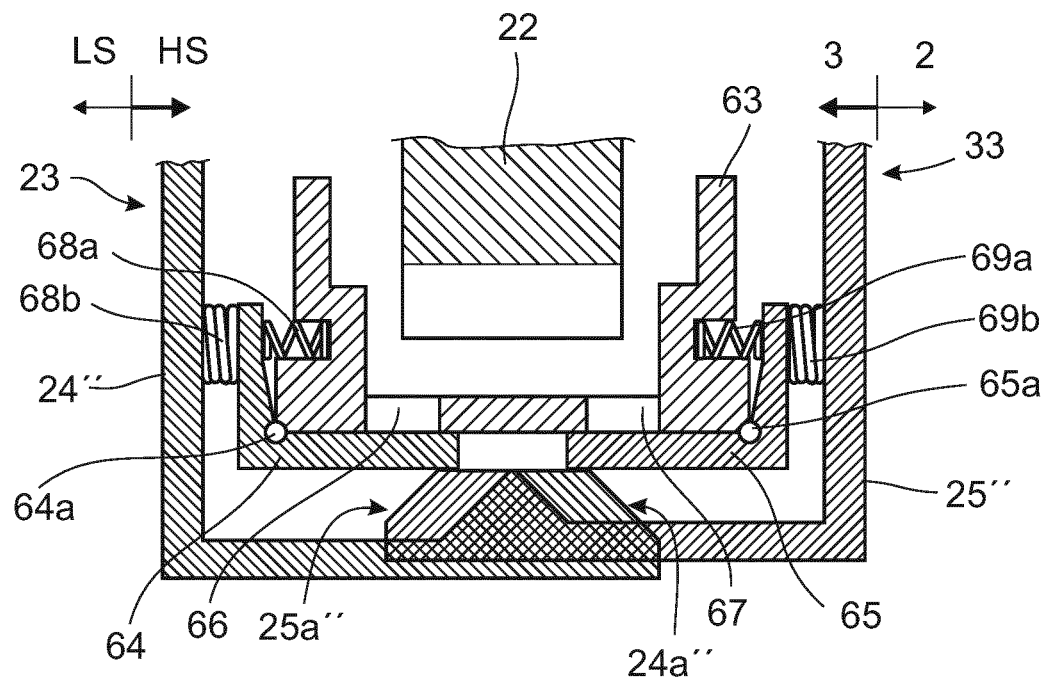

FIG. 6C shows an operating state where the first gear shift mechanism 23 is located in its second active position HS, connecting the second splitter loose gearwheel to the input shaft, and the second gear shift mechanism 33 is located in its first active position, connecting the second splitter loose gearwheel to the output shaft in order to place the transmission in the direct gear. In this state, the second splitter gear set is not transmitting power, whereby lubrication is not required. In this example, the cam 24a" on the first closing device 24' is arranged to act on and maintain the second pivoting valve 65 closed, thereby closing the second opening 67 in the gutter 63. At the same time, the cam 25a" on the second closing device 25" is arranged to act on and maintain the first pivoting valve 64 closed, thereby closing the first opening 66 in the gutter 63, thereby preventing lubricant supply. Although the first and second resilient elements 68b, 69b on the first and second closing devices 24", 25" are both acting on the respective first and second pivoting valves 64, 65, the cams 24a", 25a" prevent the valves from opening.

Figure 6D:
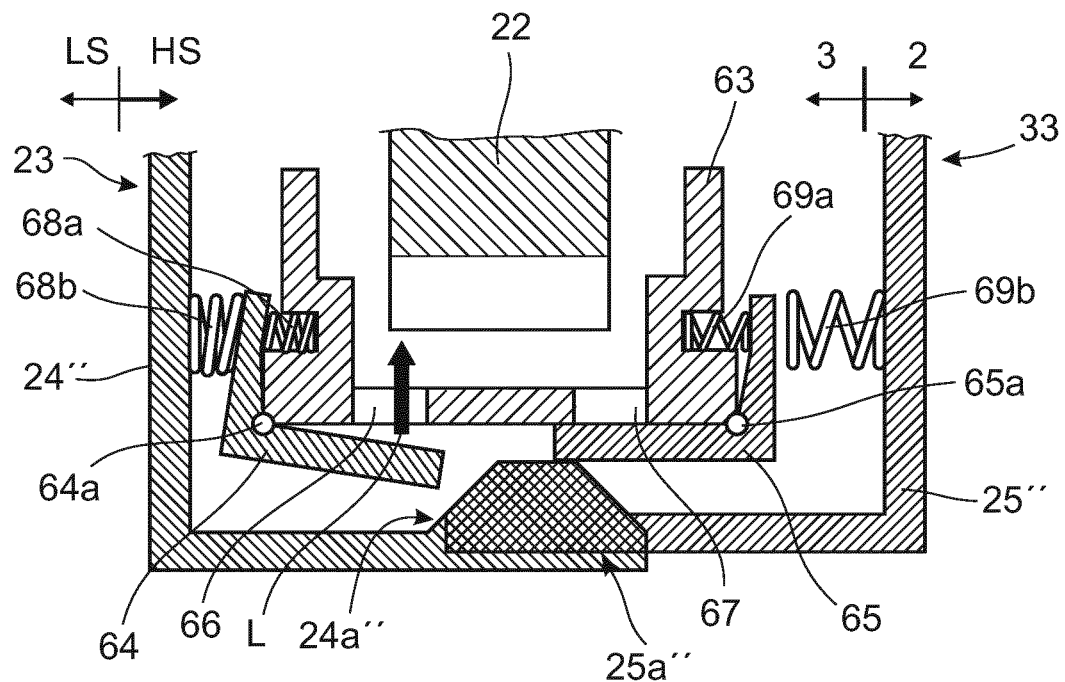

FIG. 6D shows an operating state where the first gear shift mechanism 23 is located in its second active position HS, connecting the second splitter loose gearwheel to the input shaft, and the second gear shift mechanism 33 is located in its neutral position, disconnecting it from both the second splitter loose gearwheel and the adjacent gear set. In this state, the second splitter gear set can transmit power from the input shaft to the counter shaft, whereby lubrication is required. In this example, the cam 24a" on the first closing device 24", as well as the cam 25a" on the second closing device 25" are arranged to act on and close the second pivoting valve 65 and the second opening 67 in the gutter 63. At the same time, the first resilient element 68b on the first closing device 24" is exerting a force in the opening direction of the first pivoting valve 64 sufficient to overcome the closing force of the resilient element 68a connected to the first pivoting valve 64. The first pivoting valve 64 is displaced towards its open position by the resilient element 68b on the first closing device 24" to uncover the first opening 66 in the gutter 63, allowing lubricant to be supplied. Note that the mechanism described here is only one example of a suitable solution. Other types of mechanisms and movements can be equally suitable as recognized by a skilled person.

The above examples relating to FIGS. 4A-4I, 5A-5D and 6A-6D describe lubricating devices utilizing dip lubrication. However, within the scope of the application it is possible to replace the lubricating gutters and their openings by the lubricating conduit and the spray nozzles indicated in FIG. 3B. The embodiments in figures, 4A-4I, 5A-5D and 6A-6D have the openings 46, 47, 56, 57, 66 and 67 fully closed when the second splitter gear set is not transmitting power. As would be recognized by a skilled person, a partial closing, for reduced, but still non-zero lubricant supply would be equally possible by adjusting the sizes and/or positions of the openings.

In the above examples, it is stated that the closing devices can be arranged to close the supply means. This option is used when transmissions lubrication is not required for the second splitter gear set when no power is being transmitted, wherein the supply of lubricant can be closed completely. In this case the closing devices will close, causing the oil level in a dip lubrication arrangement to fall below the periphery of the lower gearwheel in the second splitter gear set. In a spray lubrication arrangement, the closing devices will simply close or cover the lubricant spray nozzles to prevent the flow of lubricant to the second splitter gear set.

In cases where the transmission requires that at least a minimum level of lubricant supply is maintained when the second splitter gear set is not transmitting power, the closing devices will close partially. This causes the oil level in a dip lubrication arrangement to a desired level, but not below the periphery of the lower gearwheel in the second splitter gear set. This can be achieved in a number of different ways, for instance, by off-setting the positions of the closing devices relative to the supply openings, either by placing a predetermined portion of the flow area of at least one supply opening outside the area covered by the closing device, or by providing a predetermined gap between the cooperating surfaces of the supply openings and the closing devices (e.g. FIGS. 4A-4I). Alternatively, the closing devices can be provided with through holes in order to ensure a minimum supply level (e.g. FIGS. 5A-5D; 6A-6D).

It is to be understood that the present invention is not limited to the embodiments described above and illustrated in the drawings; rather, the skilled person will recognize that many changes and modifications may be made within the scope of the appended claims.

The invention claimed is:

1. A lubricating device for controlling lubrication in a stepped transmission comprising a splitter section with an input shaft and a main gear section with an output shaft and a countershaft;
   the splitter section comprising:
      a first splitter gear set connectable to the input shaft by a first gear shift mechanism;
      a second splitter gear set connectable to the input shaft by the first gear shift mechanism and connectable to the output shaft by a second gear shift mechanism; and
   wherein:
      a lubrication arrangement for the second splitter gear set is controlled by current positions of the first and the second gear shift mechanisms;
      the lubrication arrangement is controlled to at least reduce lubrication when the first and the second gear shift mechanisms are simultaneously connected to the second splitter gear set; and
      the lubrication arrangement is deactivated when the first and the second gear shift mechanisms are simultaneously connected to the second splitter gear set.

2. The lubricating device of claim 1,
   wherein the lubrication arrangement comprises a first and a second supply component for lubricant,
   wherein the first and the second supply components comprise a first and a second sliding closing device controllable by the first or the second gear shift mechanism.

3. The lubricating device of claim 1,
   wherein the lubrication arrangement comprises a first and a second supply component for lubricant, and
   wherein the first and the second supply components comprise:
      a first and a second opening in a lubricant gutter connected to a lubricant supply; and
      a first and a second sliding closing device controllable by the first or the second gear shift mechanism and arranged to close at least one of the first or the second opening in response to the current positions of the first and the second gear shift mechanisms.

4. The lubricating device of claim 1,
   wherein the lubrication arrangement comprises a first and a second supply component for lubricant,
   wherein the first and the second supply components comprise;
      a first and a second spray nozzle adjacent the second splitter gear set and connected to a lubricant supply; and
      a first and a second sliding closing device controllable by the first or the second gear shift mechanism and arranged to at least partially close at least one of the first or the second spray nozzles in response to the positions of the first and the second gear shift mechanisms.

5. The lubricating device of claim 2, wherein the first gear shift mechanism is mechanically connected to the first closing device by a first sealing device, and the second gear shift mechanism is mechanically connected to the second closing device by a second sealing device.

6. The lubricating device of claim 2, wherein the lubrication arrangement is at least reduced when the second splitter gear set is simultaneously disconnected from the input shaft by the first gear shift mechanism and disconnected from the output shaft by the second gear shift mechanism.

7. The lubricating device of claim 2, wherein the first gear shift mechanism is arranged to act on the first sliding closing device to at least partially close the first supply component and that the second gear shift mechanism is arranged to act on the second sliding closing device to close the second supply component when the second splitter gear set is disconnected from both the input shaft and the output shaft.

8. The lubricating device of claim 2, wherein the lubrication arrangement is controlled to at least reduce lubrication when the second splitter gear set is simultaneously connected to the input shaft by the first gear shift mechanism and to the output shaft by the second gear shift mechanism.

9. The lubricating device of claim 2, wherein the first gear shift mechanism is arranged to act on the first sliding closing device to at least partially close the second supply component and that the second gear shift mechanism is arranged to act on the second sliding closing device to at least partially close the first supply component when the second splitter gear set is connected to both the input shaft and the output shaft.

10. The lubricating device of claim 2, wherein the first sliding closing device comprises a sliding portion arranged to at least partially close the first supply component when the second splitter gear set is disconnected from the input shaft and arranged to open the first supply component and at least partially close the second supply component when the second splitter gear set is connected to the input shaft.

11. The lubricating device of claim 2, wherein the second sliding closing device comprises a sliding portion arranged to at least partially close the second supply component when the second splitter gear set is disconnected from the output shaft and arranged to at least partially close the first supply component and open the second supply component when the second splitter gear set is connected to the output shaft.

12. The lubricating device of claim 10, wherein the sliding portions of the first and the second closing devices each comprise a sealing surface with a through opening that is indexable with the first and the second supply components, respectively.

13. The lubricating device of claim 10, wherein the sliding portions of the first and the second closing devices each comprise a cam arranged to act on a first or a second pivoting valve to close the first or the second supply components; wherein the first and the second pivoting valves are spring loaded towards an open position.

14. The lubricating device of claim 10,
wherein the sliding portions of the first and the second closing device each comprise a cam arranged to act on a first or a second pivoting valve to close the first or second supply components; and
wherein each valve of the first and second pivoting valve is spring loaded towards a closed position by first springs and are displaced towards an open position by second springs under the action of either of the first and the second gear shift mechanisms.

15. The lubricating device of claim 1, wherein the lubrication arrangement is controlled to reduce lubrication when the first and the second gear shift mechanisms are simultaneously disconnected from the second splitter gear set.

16. The lubricating device according to claim 15, wherein the lubrication arrangement is deactivated when the first and the second gear shift mechanisms are simultaneously disconnected from the second splitter gear set.

17. A lubricating device for controlling lubrication in a stepped transmission comprising a splitter section with an input shaft and a main gear section with an output shaft and a countershaft;
the splitter section comprising:
a first splitter gear set connectable to the input shaft by a first gear shift mechanism;
a second splitter gear set connectable to the input shaft by the first gear shift mechanism and connectable to the output shaft by a second gear shift mechanism; and
wherein:
a lubrication arrangement for the second splitter gear set is controlled by current positions of the first and the second gear shift mechanisms; and
the lubrication arrangement is controlled to at least reduce lubrication when the first and the second gear shift mechanisms are simultaneously connected to the second splitter gear set;
wherein the lubrication arrangement comprises a first and a second supply component for lubricant, and
wherein the first and the second supply components comprise:
a first and a second opening in a lubricant gutter connected to a lubricant supply; and
a first and a second sliding closing device controllable by the first or the second gear shift mechanism and arranged to close at least one of the first or the second opening in response to the current positions of the first and the second gear shift mechanisms.

18. A lubricating device for controlling lubrication in a stepped transmission comprising a splitter section with an input shaft and a main gear section with an output shaft and a countershaft;
the splitter section comprising:
a first splitter gear set connectable to the input shaft by a first gear shift mechanism;
a second splitter gear set connectable to the input shaft by the first gear shift mechanism and connectable to the output shaft by a second gear shift mechanism; and
wherein:
a lubrication arrangement for the second splitter gear set is controlled by current positions of the first and the second gear shift mechanisms; and
the lubrication arrangement is controlled to at least reduce lubrication when the first and the second gear shift mechanisms are simultaneously connected to the second splitter gear set;
wherein the lubrication arrangement comprises a first and a second supply component for lubricant, and
wherein the first and the second supply components comprise;
a first and a second spray nozzle adjacent the second splitter gear set and connected to a lubricant supply; and
a first and a second sliding closing device controllable by the first or the second gear shift mechanism and arranged to at least partially close at least one of the first or the second spray nozzles in response to the positions of the first and the second gear shift mechanisms.

19. A lubricating device for controlling lubrication in a stepped transmission comprising a splitter section with an input shaft and a main gear section with an output shaft and a countershaft;
the splitter section comprising:
a first splitter gear set connectable to the input shaft by a first gear shift mechanism;
a second splitter gear set connectable to the input shaft by the first gear shift mechanism and connectable to the output shaft by a second gear shift mechanism; and
wherein:
a lubrication arrangement for the second splitter gear set is controlled by current positions of the first and the second gear shift mechanisms; and
the lubrication arrangement is controlled to at least reduce lubrication when the first and the second gear shift mechanisms are simultaneously connected to the second splitter gear set;
wherein the lubrication arrangement comprises a first and a second supply component for lubricant,
wherein the first and the second supply components comprise a first and a second sliding closing device controllable by the first or the second gear shift mechanism; and
wherein the lubrication arrangement is at least reduced when the second splitter gear set is simultaneously disconnected from the input shaft by the first gear shift mechanism and disconnected from the output shaft by the second gear shift mechanism.

20. A lubricating device for controlling lubrication in a stepped transmission comprising a splitter section with an input shaft and a main gear section with an output shaft and a countershaft;
the splitter section comprising:
a first splitter gear set connectable to the input shaft by a first gear shift mechanism;
a second splitter gear set connectable to the input shaft by the first gear shift mechanism and connectable to the output shaft by a second gear shift mechanism; and
wherein:
a lubrication arrangement for the second splitter gear set is controlled by current positions of the first and the second gear shift mechanisms; and
the lubrication arrangement is controlled to at least reduce lubrication when the first and the second gear shift mechanisms are simultaneously connected to the second splitter gear set;
wherein the lubrication arrangement comprises a first and a second supply component for lubricant, wherein the first and the second supply components comprise a first and a second sliding closing device controllable by the first or the second gear shift mechanism; and wherein the lubrication arrangement is controlled to at least reduce lubrication when the second splitter gear set is simultaneously connected to the input shaft by the first gear shift mechanism and to the output shaft by the second gear shift mechanism.

* * * * *